United States Patent
Tak et al.

(10) Patent No.: US 7,342,633 B2
(45) Date of Patent: Mar. 11, 2008

(54) LIQUID CRYSTAL DISPLAY AND THIN FILM TRANSISTOR ARRAY PANEL THEREFOR

(75) Inventors: Young-Mi Tak, Seoul (KR); Seung-Soo Baek, Seoul (KR); Dong-Gyu Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 206 days.

(21) Appl. No.: 10/877,673

(22) Filed: Jun. 25, 2004

(65) Prior Publication Data

US 2004/0263756 A1 Dec. 30, 2004

(30) Foreign Application Priority Data

Jun. 26, 2003 (FR) .................. 10-2003-0041987

(51) Int. Cl.
*G02F 1/1343* (2006.01)
(52) U.S. Cl. .................... 349/145; 349/129
(58) Field of Classification Search ............. 349/145, 349/141, 129, 146

See application file for complete search history.

(56) References Cited

U.S. PATENT DOCUMENTS

| 6,400,424 | B1 * | 6/2002 | Kim et al. ............ 349/38 |
| 6,459,465 | B1 * | 10/2002 | Lee .................. 349/141 |
| 6,593,982 | B2 * | 7/2003 | Yoon et al. ........... 349/106 |
| 6,597,424 | B2 * | 7/2003 | Hattori et al. ......... 349/146 |
| 6,710,836 | B2 * | 3/2004 | Lee .................. 349/141 |
| 2002/0180918 | A1 | 12/2002 | Yamada |
| 2003/0043327 | A1 | 3/2003 | Aoyama et al. |
| 2004/0227894 | A1 * | 11/2004 | Kim et al. ........... 349/145 |

* cited by examiner

*Primary Examiner*—David Nelms
*Assistant Examiner*—David Y. Chung
(74) *Attorney, Agent, or Firm*—F. Chau & Associates, LLC

(57) ABSTRACT

A thin film transistor array panel is provided, which includes: a substrate; a plurality of first signal lines formed on the substrate; a plurality of second lines formed on the substrate, intersecting the first signal line, and including a plurality of curved portions having at least two curve points and a plurality of intermediate portions, the curved portions and the intermediate portions alternately connected; a plurality of pixel electrodes located substantially in areas defined by the first and the second signal lines; and a plurality of thin film transistors connected to the first and the second signal lines and the pixel electrodes.

8 Claims, 8 Drawing Sheets

LIQUID CRYSTAL DISPLAY AND THIN FILM TRANSISTOR ARRAY PANEL THEREFOR

BACKGROUND OF THE INVENTION (a) Field of the Invention

The present invention relates to a liquid crystal display and a thin film transistor array panel therefor.

(b) Description of the Related Art

A liquid crystal display (LCD) is one of the most widely used flat panel displays. An LCD includes a liquid crystal (LC) layer interposed between a pair of panels provided with field-generating electrodes. The LC layer is subject to an electric field generated by the electrodes and variations in the field strength change the molecular orientation of the LC layer, which in turn change the polarization of light passing through the LC layer. Appropriately disposed polarizer(s) change the light transmittance based on the polarization of the light.

One measure of LCD quality is a viewing angle that is defined by angle where the LCD exhibits a predetermined contrast ratio. Various techniques for enlarging the viewing angle have been suggested, including a technique utilizing a vertically aligned LC layer and providing cutouts or protrusions at the field-generating electrodes such as pixel electrodes and a common electrode.

However, cutouts and the protrusions reduce the aperture ratio. To increase aperture ratio, it has been suggested that the size of the pixel electrodes be maximized. However, maximization of the size of the pixel electrodes results in a close distance between the pixel electrodes, causing strong lateral electric fields between the pixel electrodes. The strong electric fields cause unwanted altering of the orientation of the LC molecules, yielding textures and light leakage and deteriorating display characteristics. The textures and the light leakage may be screened by a wide black matrix, which also reduces the aperture ratio.

In the meantime, the size of the pixel electrodes is increased as the LCD increases. The shape of the pixel electrodes is not recognized when the pitch of the pixel electrodes is small, for example, smaller than about 100 microns. However, the outline of the pixel electrodes defined by signal lines such as an oblique outline may be perceived when the pitch of the pixel electrodes becomes large, for example, larger than about 100 microns, thereby deteriorating display characteristics. In addition, the oblique shape of the pixel electrodes may weaken a driving electric field to liquid crystal molecules located at some positions to increase the response time.

SUMMARY OF THE INVENTION

A motivation of the present invention is to solve the above-described and other problems.

A thin film transistor array panel is provided, which includes: a substrate; a plurality of first signal lines formed on the substrate; a plurality of second lines formed on the substrate, intersecting the first signal line, and including a plurality of curved portions having at least two curve points and a plurality of intermediate portions, the curved portions and the intermediate portions alternately connected; a plurality of pixel electrodes located substantially in areas defined by the first and the second signal lines; and a plurality of thin film transistors connected to the first and the second signal lines and the pixel electrodes.

Each of the curved portions of the data lines may include a plurality of rectilinear portions connected to each other and making angles of about 45 degrees with the gate lines in clockwise and counterclockwise manners, respectively.

The thin film transistor array panel may further include a plurality of third signal lines formed on the substrate, extending substantially parallel to the first signal lines, and overlapping the pixel electrodes to form storage capacitors.

The thin film transistors may include terminal electrodes connected to the intermediate portions of the second signal lines.

The pixel electrodes may have cutouts disposed on the data lines, each cutout bisecting a corresponding of the pixel electrodes into two partitions.

A thin film transistor array panel is provided, which includes: a substrate; a gate line formed on the substrate and including a gate electrode; a gate insulating layer formed on the gate line; a semiconductor layer formed on the gate insulating layer; a data line formed on the substrate and including a curved portion having at least two curved points and including a source electrode disposed on the semiconductor layer at least in part; a drain electrode disposed on the semiconductor layer at least in part and disposed opposite the source electrode; a passivation layer formed on the semiconductor layer; and a pixel electrode having an edge curved along the data line.

The curved portion of the data line may include a plurality of portions making a clockwise angle of about 45 degrees and a counterclockwise angle of about 45 degrees with respect to the gate line.

The thin film transistor array panel may further include a storage electrode line that extends substantially parallel to the gate line and has a storage electrode overlapping a conductor connected to the pixel electrode to form a storage capacitor.

The pixel electrode may be disposed on the passivation layer.

The first passivation layer may include organic or inorganic insulating material.

The thin film transistor array panel may further include a color filter formed on the first passivation layer.

The color filter may extend substantially parallel to the data line.

The semiconductor layer may have substantially the same planar shape as the data line, the source electrode, and the drain electrode except for a first portion.

A liquid crystal is provided, which includes: a first substrate; a gate line formed on the first substrate and including a gate electrode; a data line formed on the first substrate and including a curved portion having at least two curve points and an intersecting portion; a thin film transistor connected to the gate line and the data line; a pixel electrode connected to the thin film transistor; a second substrate facing the first substrate; a common electrode formed on the second substrate; a liquid crystal layer disposed between the first and the second substrates; and at least a domain defining member formed on at least one of the first and the second substrates and partitioning the liquid crystal layer into a plurality of domains, each domain having two major edges substantially parallel to the curved portion of the data line.

The liquid crystal layer may have negative dielectric anisotropy and is vertically aligned.

The domain partitioning member may include a cutout in the pixel electrode or the common electrode.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
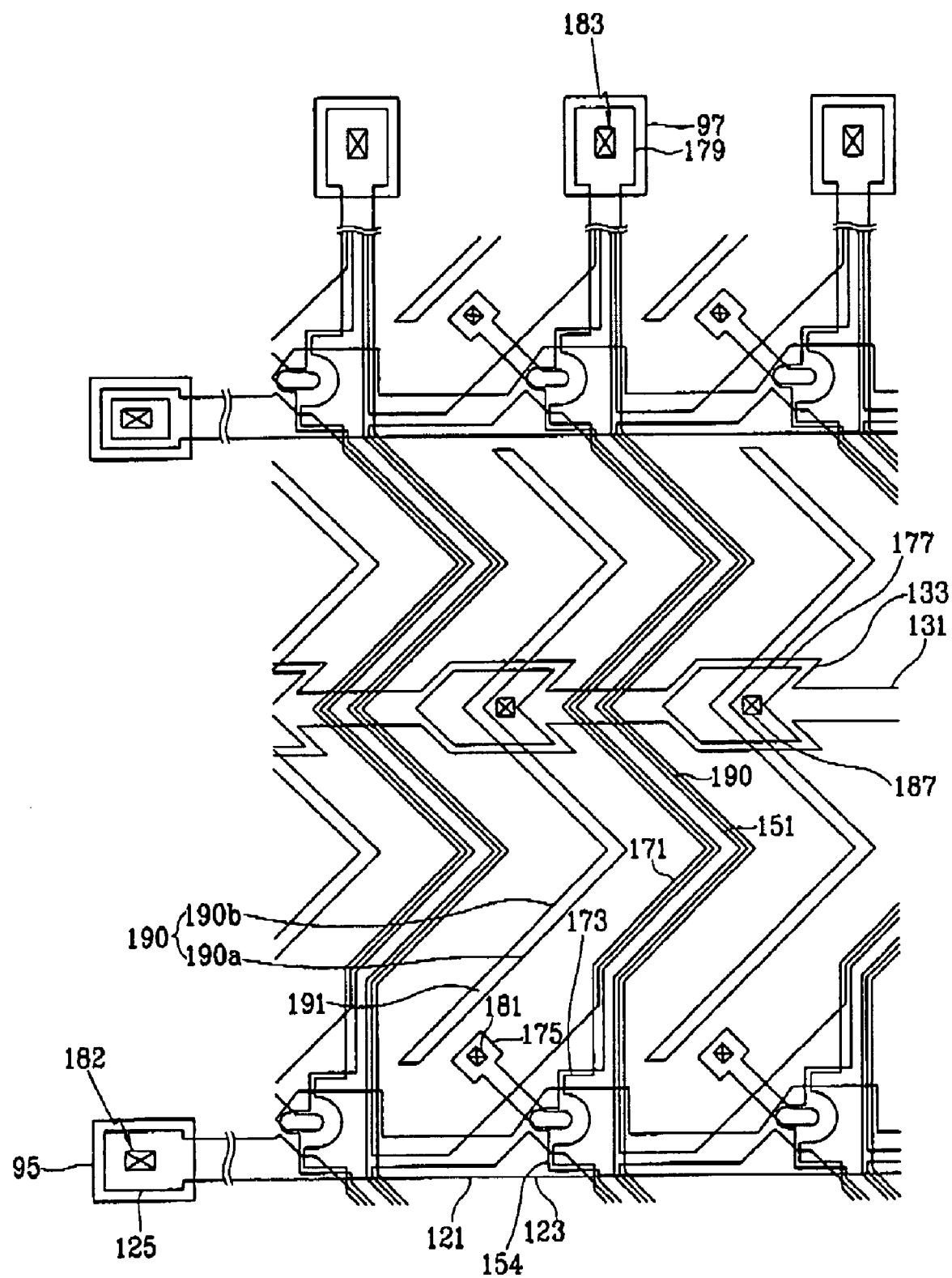
FIG. 1 is a layout view of a TFT array panel for an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays and thin film transistor (TFT) array panels for LCDs according to embodiments of the present invention will be described with reference to the accompanying drawings.

An LCD according to an embodiment of the present invention is described in detail with reference to FIGS. 1-5.

Figure 2:
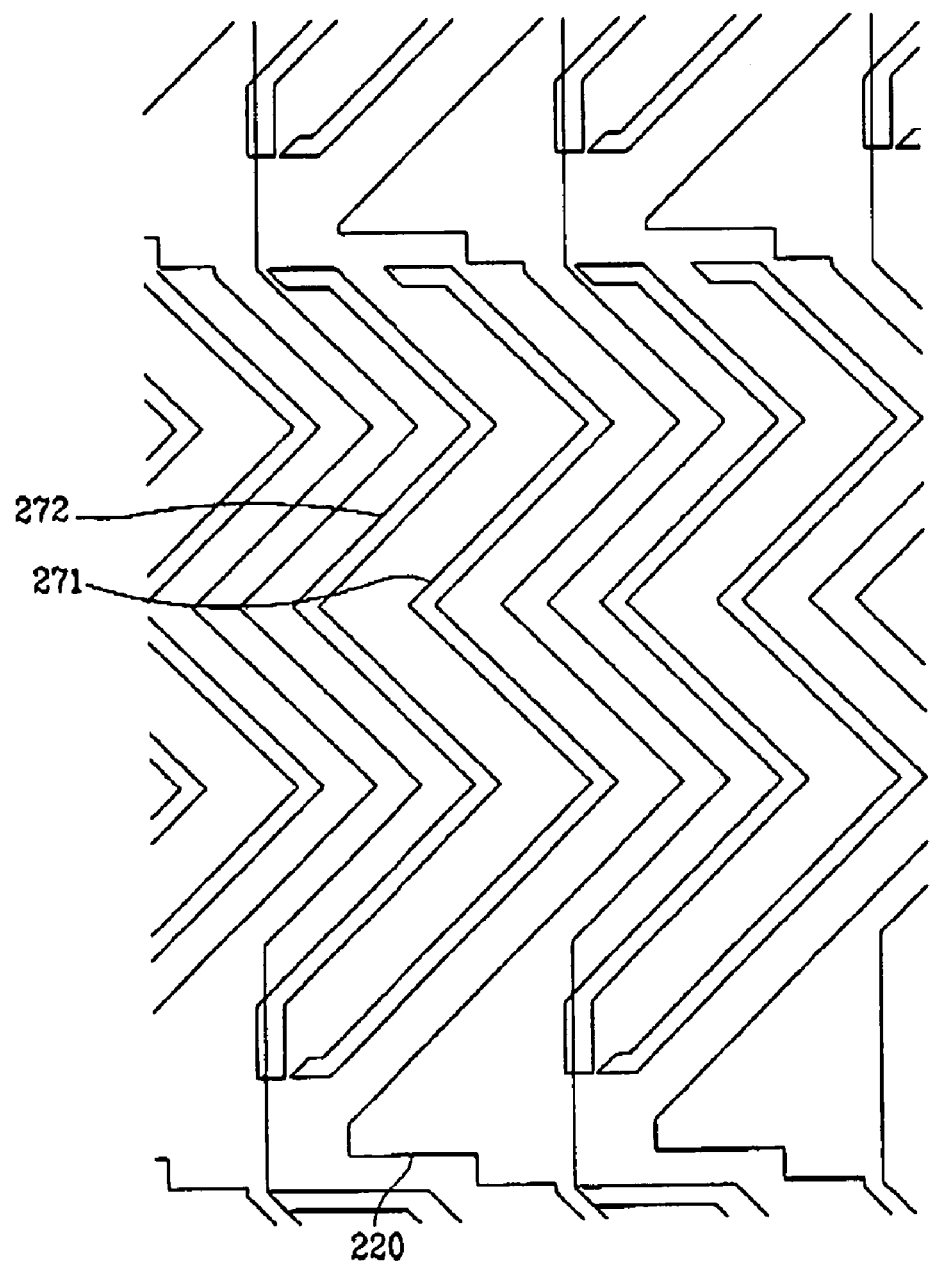
FIG. 2 is a layout view of a common electrode panel for an LCD according to an embodiment of the present invention.
Figure 3:
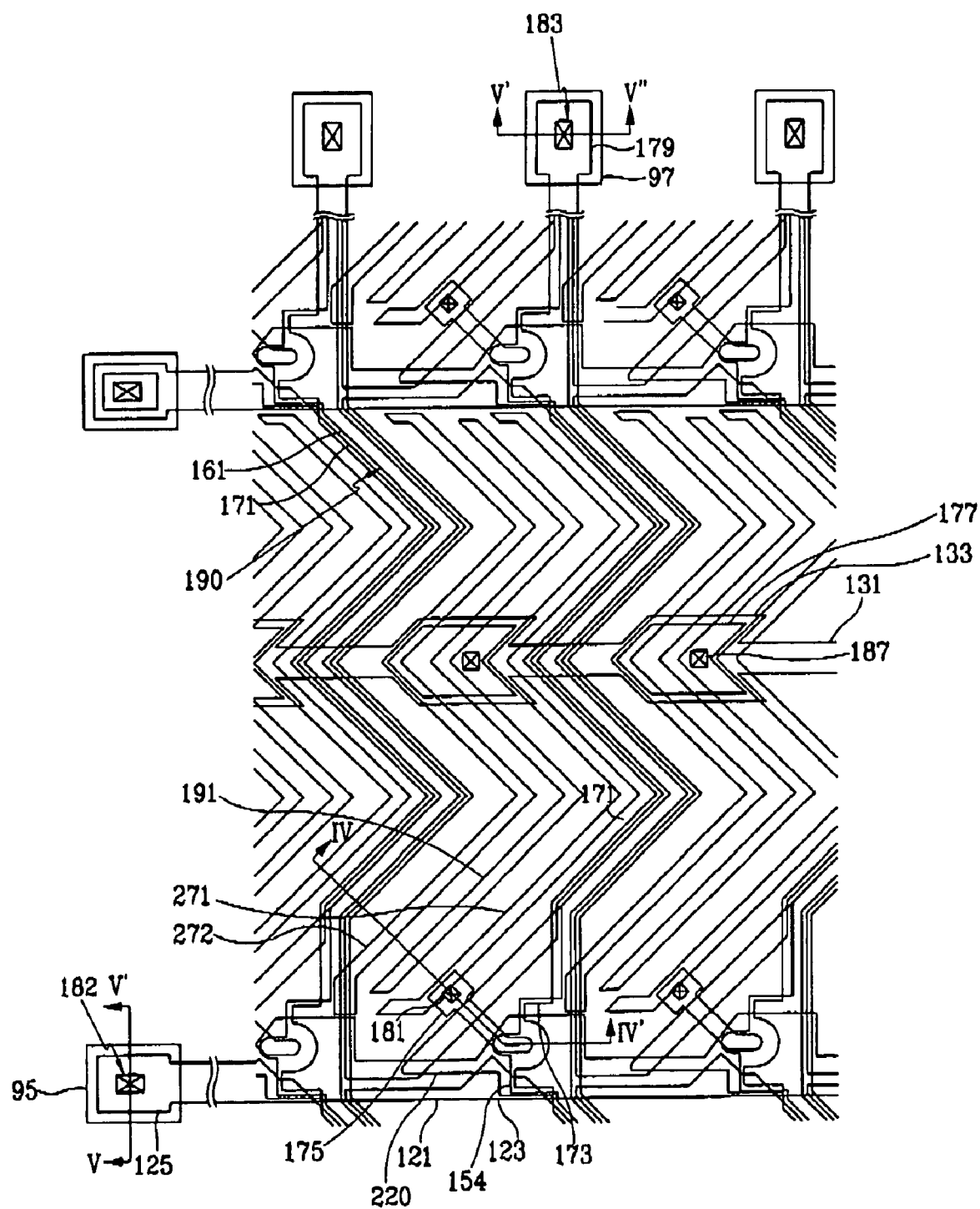
FIG. 3 is a layout view of an LCD including the TFT array panel shown in FIG. 1 and the common electrode panel shown in FIG. 2.
Figure 4:
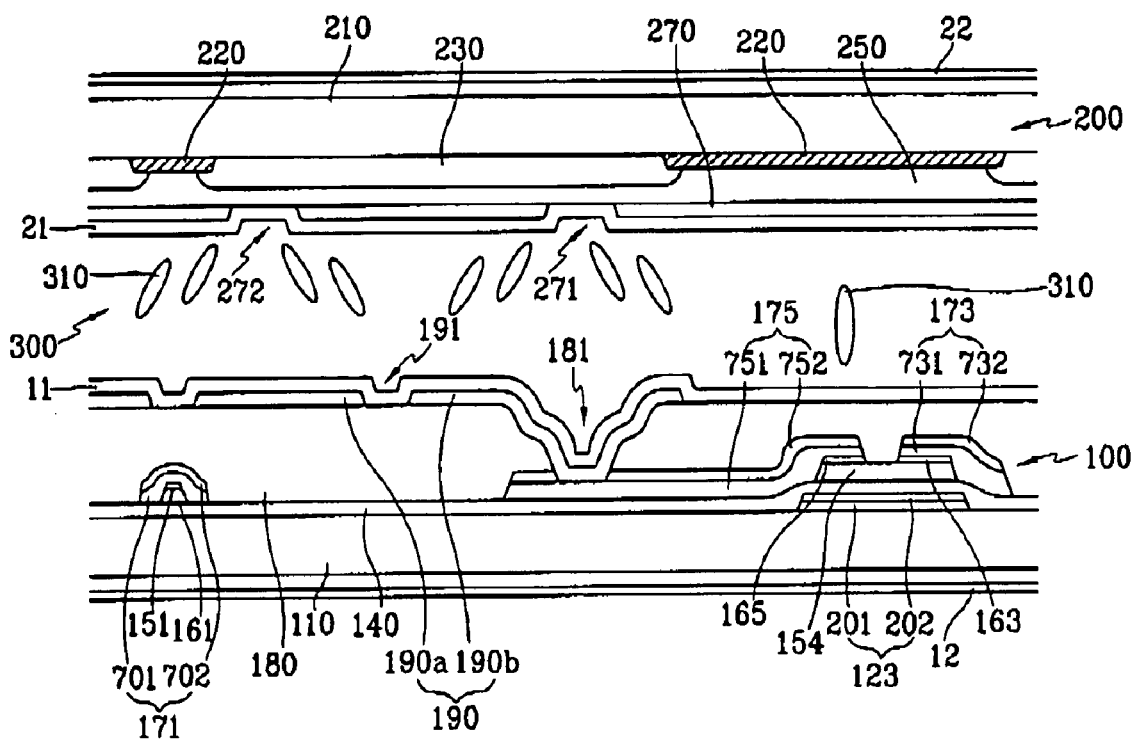
FIG. 4 is a sectional view of the LCD shown in FIG. 3 taken along the line IV-IV'.
Figure 5:
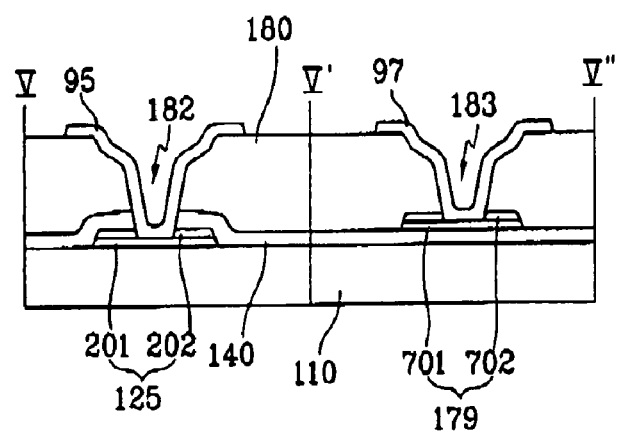
FIG. 5 is a sectional view of the LCD shown in FIG. 3 taken along the lines V-V' and V'-V"

FIG. 1 is a layout view of a TFT array panel for an LCD according to an embodiment of the present invention, FIG. 2 is a layout view of a common electrode panel for an LCD according to an embodiment of the present invention, FIG. 3 is a layout view of an LCD including the TFT array panel shown in FIG. 1 and the common electrode panel shown in FIG. 2, FIG. 4 is a sectional view of the LCD shown in FIG. 3 taken along the line IV-IV', and FIG. 5 is a sectional view of the LCD shown in FIG. 3 taken along the lines V-V' and V'-V".

An LCD according to an embodiment of the present invention includes a TFT array panel 100, a common electrode panel 200 facing the TFT array panel 100, and a LC layer 300 interposed between the TFT array panel 100 and the common electrode panel 200.

The TFT array panel 100 is now described in detail with reference to FIGS. 1, 4 and 5.

A plurality of gate lines 121 and a plurality of storage electrode lines 131 are formed on an insulating substrate 110.

The gate lines 121 extend substantially in a transverse direction and are separated from each other and transmit gate signals. Each gate line 121 includes a plurality of projections forming a plurality of gate electrodes 123 and an end portion 125 having a large area for contact with another layer or an external device.

The storage electrode lines 131 extend substantially in the transverse direction and they are substantially equidistant from adjacent gate lines 121. However, the storage electrode lines 131 may be closer to one of the adjacent gate lines 121. Each storage electrode line 131 includes a plurality of projections forming storage electrodes 133 having a shape of a chevron that is symmetrical with respect to the storage electrode line 131 and makes an angle of about 45 degrees with the storage electrode line 131. The storage electrode lines 131 are supplied with a predetermined voltage such as a common voltage, which is applied to a common electrode 270 on the common electrode panel 200 of the LCD.

The gate lines 121 and the storage electrode lines 131 have a multi-layered structure including two films having different physical characteristics, a lower film and an upper film. The upper film is preferably made of low resistivity metal including Al containing metal such as Al and Al alloy, Ag containing metal such as Ag and Ag alloy, or Cu containing metal such as Cu and Cu alloy for reducing signal delay or voltage drop in the gate lines 121 and the storage electrode lines 131. On the other hand, the lower film is preferably made of material such as Cr, Mo, Mo alloy, Ta, or Ti, which has good physical, chemical, and electrical contact characteristics with other materials such as indium tin oxide (ITO) or indium zinc oxide (IZO). A good exemplary combination of the lower film material and the upper film material is Cr and Al—Nd alloy. In FIGS. 4, the lower and the upper films of the gate electrodes 123 are indicated by reference numerals 231 and 232, respectively, the lower and the upper films of the end portions 125 are indicated by reference numerals 251 and 252, respectively, and the lower and the upper films of the storage electrodes 133 are indicated by reference numerals 331 and 332, respectively. Portions of the upper film 252 of the end portions 125 of the gate lines 121 are removed to expose the underlying portions of the lower films 251.

The gate lines 121 and the storage electrode lines 131 may have a single layer structure or may include three or more layers.

In addition, the lateral sides of the gate lines 121 and the storage electrode lines 131 are inclined relative to a surface of the substrate 110, and the inclination angle thereof ranges about 30-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated as "a-Si") or polysilicon are formed on the gate insulating layer 140. Each semiconductor stripe 151 extends substantially in the longitudinal direction while it is curved periodically. Each semiconductor stripe 151 has a plurality of projections 154 branched out toward the gate electrodes 123.

A plurality of ohmic contact stripes and islands 161 and 165 preferably made of silicide or n+hydrogenated a-Si heavily doped with n type impurity such as phosphorous (P) are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range between about 30-80 degrees.

A plurality of data lines 171, a plurality of drain electrodes 175, and a plurality of storage capacitor conductors 177, which are separated from each other, are formed on the ohmic contacts 161 and 165 and the gate insulating layer 140.

The data lines 171 for transmitting data voltages extend substantially in the longitudinal direction and intersect the gate lines 121 and the storage electrode lines 131. Each data line 171 has an end portion 179 having a large area for contact with another layer or an external device and it includes a plurality of sets of oblique portions and a plurality of longitudinal portions such that it curves periodically. A set of oblique portions includes four oblique portions connected in turn to form a character "W" rotated by a right angle and opposite ends of the set of oblique portions are connected to respective longitudinal portions. The oblique portions of the data lines 171 make an angle of about 45 degrees with the gate lines 121, and the longitudinal portions cross over the gate electrodes 123. The length of a set of oblique portions is about one to nine times the length of a longitudinal portion, that is, it occupies about 50-90 percents of the total length of the pair of oblique portions and the longitudinal portion.

Each longitudinal portion of the data lines 171 includes a plurality of projections such that the longitudinal portion including the projections forms a source electrode 173 partly enclosing an end portion of a drain electrode 175. Each set of a gate electrode 123, a source electrode 173, and a drain electrode 175 along with a projection 154 of a semiconductor stripe 151 form a TFT having a channel formed in the semiconductor projection 154 disposed between the source electrode 173 and the drain electrode 175.

The storage capacitor conductors 177 overlap the storage electrodes 133 and have substantially the same shape as the storage electrodes 133.

Instead of providing the storage capacitor conductors 177, the drain electrodes 175 may extend to overlap the storage electrodes 133. In this case, the drain electrodes 175 may have expansions overlapping the storage electrodes 133 and having substantially the same shape as the storage electrodes 133.

The data lines 171 and the drain electrodes 175 also include a lower film 711 and 751 preferably made of Mo, Mo alloy or Cr and an upper film 712 and 752 located thereon and preferably made of Al containing metal. In FIGS. 4 and 5, the lower and the upper films of the source electrodes 173 are indicated by reference numerals 731 and 732, respectively, and the lower and the upper films of the end portions 179 of the data lines 171 are indicated by reference numerals 791 and 792, respectively. Portion of the upper films 792, 752 of the expansions 179 of the data lines 171 and the drain electrodes 175 are removed to expose the underlying portions of the lower films 791 and 751.

Like the gate lines 121 and the storage electrode lines 131, the data lines 171 and the drain electrodes 175 have inclined lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween.

A passivation layer 180 is formed on the data lines 171 and the drain electrodes 175, and exposed portions of the semiconductor stripes 151, which are not covered with the data lines 171 and the drain electrodes 175. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride and silicon oxide. The passivation layer 180 may have a double-layered structure including a lower inorganic film and an upper organic film.

The passivation layer 180 has a plurality of contact holes 181, 183 and 187 exposing the drain electrodes 175, the end portions 179 of the data lines 171, and the storage capacitor conductors 177, respectively. The passivation layer 180 and the gate insulating layer 140 have a plurality of contact holes 182 exposing the end portions 125 of the gate lines 121. The contact holes 181, 182, 183 and 187 can have various shapes such as polygon or circle. The area of each contact hole 182 or 183 is preferably equal to or larger than about 0.5 mm×15 µm and not larger than about 2 mm×60 µm. The sidewalls of the contact holes 181, 182, 183 and 187 are inclined with an angle of about 30-85 degrees or have stepwise profiles.

A plurality of pixel electrodes 190 and a plurality of contact assistants 95 and 97, which are preferably made of ITO or IZO, are formed on the passivation layer 180. Alternatively, the pixel electrodes 190 may be made of transparent conductive polymer, and, for a reflective LCD, the pixel electrodes 190 are made of opaque reflective metal. In these cases, the contact assistants 192 and 199 may be made of material such as ITO or IZO different from the pixel electrodes 190.

Each pixel electrode 190 is located substantially in an area enclosed by the data lines 171 and the gate lines 121, and thus it also forms a twin chevron. Each pixel electrode 190 has a cutout 191 that bisects the pixel electrode 190 into left and right partitions 190a and 190b arranged in the transverse direction. Each cutout 191 includes four oblique portions that extending parallel to the data lines 171. The pixel electrodes 190 cover the storage electrode lines 131 including the storage electrodes 133 and the storage capacitor conductors 177 and have chamfered edges substantially parallel to the cutouts 191.

The pixel electrodes 190 are physically and electrically connected to the drain electrodes 175 through the contact holes 181 and to the storage capacitor conductors 177 through the contact holes 187 such that the pixel electrodes 190 receive the data voltages from the drain electrodes 175 and transmit the received data voltages to the storage capacitor conductors 177. The pixel electrodes 190 supplied with the data voltages generate electric fields in cooperation with the common electrode 270, which reorient liquid crystal molecules 310 disposed therebetween.

A pixel electrode 190 and a common electrode form a capacitor called a "liquid crystal capacitor," which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the storage electrode lines 131. The capacitances of the storage capacitors, i.e., the storage capacitances are increased by providing the projections (i.e., the storage electrodes 133) at the storage electrode lines 131 for increasing overlapping areas, and by providing the storage capacitor conductors 177, which are connected to the pixel electrodes 190 and overlap the storage electrodes 133, under the pixel electrodes 190 for decreasing the distance between the terminals.

The pixel electrodes 190 overlap the data lines 171 as well as the gate lines 121 to increase aperture ratio.

The contact assistants 95 and 97 are connected to the exposed end portions 125 of the gate lines 121 and the exposed end portions 179 of the data lines 171 through the contact holes 182 and 183, respectively. The contact assistants 95 and 97 protect the exposed portions 125 and 179 and complement the adhesiveness of the exposed portions 125 and 179 and external devices.

Finally, an alignment layer 11 is formed on the pixel electrodes 190 and the passivation layer 180.

The description of the common electrode panel 200 follows with reference to FIGS. 2,4 and 5.

A light blocking member 220 called a black matrix is formed on an insulating substrate 210 such as transparent glass and it includes a plurality of oblique portions facing the oblique portions of the data lines 171 and a plurality of right-angled-triangular portions facing the TFTs and the longitudinal portions of the data lines 171 such that the light blocking member 220 prevents light leakage between the pixel electrodes 190 and defines open areas facing the pixel electrodes 190. Each of the triangular portions of the light blocking member 220 has a hypotenuse parallel to a chamfered edge of a pixel electrode 190.

A plurality of color filters 230 are formed on the substrate 210 and the light blocking member 220 and it is disposed substantially in the open areas defined by the light blocking member 220. The color filters 230 disposed in adjacent two data lines 171 and arranged in the longitudinal direction may be connected to each other to form a stripe. Each color filter 230 may represent one of three primary colors such as red, green and blue colors.

An overcoat 250 preferably made of organic material is formed on the color filters 230 and the light blocking member 220. The overcoat 250 protects the color filters 230 and gives a flat top surface.

A common electrode 270 preferably made of transparent conductive material such as ITO and IZO is formed on the overcoat 250. The common electrode 270 is supplied with the common voltage and it has a plurality of pairs of chevron-like cutouts 271 and 272.

Each of the cutouts 271 and 272 includes four oblique portions connected in turn, a transverse portion connected to one of the oblique portions, and a transverse or longitudinal portion connected to the other of the oblique portions. The oblique portions of the cutout 271/272 extend substantially parallel to the oblique portions of the data lines 171 and face a partition 190a/190b of a pixel electrode 190 so that they may bisect the partition 190a/190b into left and right halves. The transverse and the longitudinal portions of the cutout 271/272 are aligned with transverse and longitudinal edges of the pixel electrode 190, respectively, and they make obtuse angles with the oblique portions of the cutout 271/272. The cutouts 271 and 272 are provided for controlling the tilt directions of the LC molecules 310 in the LC layer 300 and preferably have a width in a range between about 9-12 microns. The cutouts 271 and 272 may be substituted with protrusions preferably made of organic material and preferably having width ranging about 5 microns to about 10 microns.

A homogeneous or homeotropic alignment layer 21 is coated on the common electrode 270.

A pair of polarizers 12 and 22 are provided on outer surfaces of the panels 100 and 200 such that their transmissive axes are crossed and one of the transmissive axes is parallel to the gate lines 121.

The LCD may further include at least one retardation film for compensating the retardation of the LC layer 300 and a backlight unit for providing light for the LCD.

The LC layer 300 has negative dielectric anisotropy and the LC molecules 310 in the LC layer 300 are aligned such that their long axes are substantially vertical to the surfaces of the panels 100 and 200 in absence of electric field.

Upon application of the common voltage to the common electrode 270 and a data voltage to the pixel electrodes 190, a primary electric field substantially perpendicular to the surfaces of the panels 100 and 200 is generated. The LC molecules 310 tend to change their orientations in response to the electric field such that their long axes are perpendicular to the field direction. In the meantime, the cutouts 191, 271 and 272 of the pixel electrodes 190 and the common electrode 270 and the edges of the pixel electrodes 190 distort the primary electric field to have a horizontal component which determines the tilt directions of the LC molecules 310. The horizontal component of the primary electric field is perpendicular to the edges of the cutouts 191, 271 and 272 and the edges of the pixel electrodes 190.

Accordingly, 16 sub-regions having various tilt directions, which are partitioned by edges of a pixel electrode 190, three cutouts 191, 271 and 272 partitioning the pixel electrode 190, and three imaginary transverse lines passing through the meeting points of the oblique portions of the cutouts 271 and 272, are formed in a pixel region of the LC layer 300, which are located on the pixel electrode 190. Each sub-region has two major edges defined by adjacent two of the cutouts 191, 271 and 272 and the oblique edges of the pixel electrode 190, which are spaced apart preferably from about 10 microns to about 30 microns. The number of the sub-regions in a pixel region is preferably four if the planar area of the pixel region is smaller than about 100×300 square microns, and, if not, it is preferably four or eight. The number of the sub-regions can be varied by changing the number of the cutouts 271 of the common electrode 270, by providing cutouts at the pixel electrodes 190, or by changing the number of curved points of the edges of the pixel electrodes 190. The sub-regions are classified into a plurality of, preferably four, domains based on the tilt directions.

In the meantime, the direction of a secondary electric field due to the voltage difference between the pixel electrodes 190 is perpendicular to the edges of the cutouts 271. Accordingly, the field direction of the secondary electric field coincides with that of the horizontal component of the primary electric field. Consequently, the secondary electric field between the pixel electrodes 190 enhances the determination of the tilt directions of the LC molecules 310.

Since the LCD performs inversion such as dot inversion, column inversion, etc., adjacent pixel electrodes are supplied with data voltages having opposite polarity with respect to the common voltage and thus a secondary electric field between the adjacent pixel electrodes is almost always generated to enhance the stability of the domains.

Since the tilt directions of all domains make an angle of about 45 degrees with the gate lines 121, which are parallel to or perpendicular to the edges of the panels 100 and 200, and the 45-degree intersection of the tilt directions and the transmissive axes of the polarizers gives maximum transmittance, the polarizers can be attached such that the transmissive axes of the polarizers are parallel to or perpendicular to the edges of the panels 100 and 200 and it reduces the production cost.

Since the pixel electrodes 190 are curved several times with maintaining the angle between the oblique edges of the pixel electrodes 190 and the gate lines 121, the width of a rectangular area occupied by a pixel electrode 190 that is curved at least twice is much smaller than that occupied by a pixel electrode 190 that is curved once. In addition, the oblique portions of the data lines 171 that define the shape of the pixel electrodes 190 are short and connected in zigzag. Accordingly, the shape of the pixel electrodes 190 is not easily recognized and it is possible to obtain an electric field sufficient to drive the liquid crystal molecules.

The resistance increase of the data lines 171 due to the curving can be compensated by widening the data lines 171 since distortion of the electric field and increase of the parasitic capacitance due to the increase of the width of the data lines 171 can be compensated by maximizing the size of the pixel electrodes 190 and by adapting a thick organic passivation layer.

The LCD shown in FIGS. 1-5 can have several modifications.

The shapes and the arrangements of the cutouts or the protrusions may be varied depending on the design factors such as the size of pixels, the ratio of the transverse edges and the longitudinal edges of the pixel electrodes, the type and characteristics of the liquid crystal layer 3, and so on.

A method of manufacturing the TFT array panel shown in FIGS. 1-5 according to an embodiment of the present invention will be now described in detail.

First, a lower conductive film preferably made of Cr, Mo, or Mo alloy and an upper conductive film preferably made of Al containing metal or Ag containing metal are sputtered in sequence on an insulating substrate 110 and they are wet or dry etched in sequence to form a plurality of gate lines 121, each including a plurality of gate electrodes 123 and an expansion 125, and a plurality of storage electrode lines 131 including a plurality of storage electrodes 133.

After sequential chemical vapor deposition of a gate insulating layer 140 with thickness of about 1,500-5,000 Å, an intrinsic a-Si layer with thickness of about 500-2,000 Å, and an extrinsic a-Si layer with thickness of about 300-600 Å, the extrinsic a-Si layer and the intrinsic a-Si layer are photo-etched to form a plurality of extrinsic semiconductor stripes and a plurality of intrinsic semiconductor stripes 151 including a plurality of projections 154 on the gate insulating layer 140.

Subsequently, two conductive films including a lower conductive film and an upper conductive film and having a thickness of 1,500-3,000 Å are sputtered in sequence and patterned to form a plurality of date lines 171, each including a plurality of source electrodes 173 and an expansion 179, a plurality of drain electrodes 175, and a plurality of storage capacitor conductors 177. The lower conductive film is preferably made of Cr, Mo, or Mo alloy, and the upper conductive film is preferably made of Al containing metal or Ag containing metal.

Thereafter, portions of the extrinsic semiconductor stripes, which are not covered with the data lines 171 and the drain electrodes 175, are removed to complete a plurality of ohmic contact stripes 161 including a plurality of projections 163 and a plurality of ohmic contact islands 165 and to expose portions of the intrinsic semiconductor stripes 151. Oxygen plasma treatment preferably follows in order to stabilize the exposed surfaces of the semiconductor stripes 151.

Next, a passivation layer 180 made of a photosensitive organic insulator is coated and exposed through a photomask having a plurality of transmissive areas and a plurality of slit areas disposed around the transmissive areas. Accordingly, portions of the passivation layer 180 facing the transmissive areas absorb the full energy of the light, while portions of the passivation layer 180 facing the slit areas partially absorb the light energy. The passivation layer 180 is then developed to form a plurality of contact holes 181 and 183 exposing portions of the drain electrodes 175 and portions of the expansions 179 of the data lines 171, respectively, and to form upper portions of a plurality of contact holes 182 exposing portions of the gate insulating layer 140 disposed on the expansions 125 of the gate lines 121. Since the portions of the passivation layer 180 facing the transmissive areas are removed to its full thickness, while the portions facing the slit areas remain to have reduced thickness, sidewalls of the contact holes 181, 182 and 183 have stepped profiles.

After removing the exposed portions of the gate insulating layer 140 to expose the underlying portions of the expansions 125 of the gate insulating layer 140, the exposed portions of the upper conductive films 752, 792 and 252 of the drain electrodes 175, the expansions 179 of the data lines 171, and the expansions 125 of the gate lines 121 are removed to expose underlying portions of the lower conductive films 751, 791 and 251 of the drain electrodes 175, the expansions 179 of the data lines 171, and the expansions 125 of the gate lines 121.

Finally, a plurality of pixel electrodes 190 and a plurality of contact assistants 92 and 97 are formed on the passivation layer 180 and on the exposed portions of the lower conductive films 751, 791 and 251 of the drain electrodes 175, the expansions 125 of the gate lines 121, and the expansions 179 of the data lines 171 by sputtering and photo-etching an IZO or ITO layer with thickness of about 400-500 Å.

An LCD according to another embodiment of the present invention will be described in detail with reference to FIGS. 6 and 7.

Figure 6:
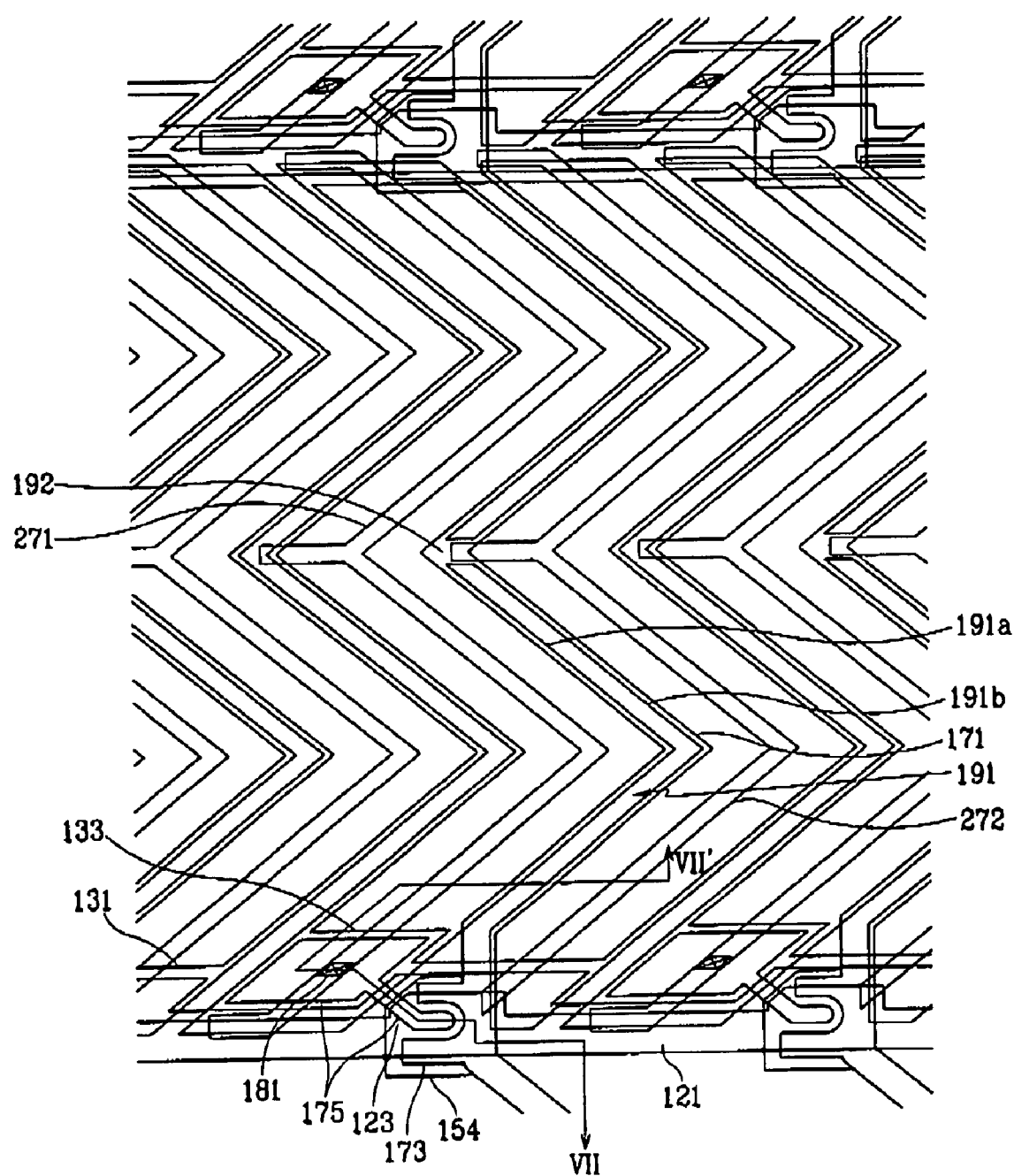
FIG. 6 is a layout view of an LCD according to another embodiment of the present invention.
Figure 7:
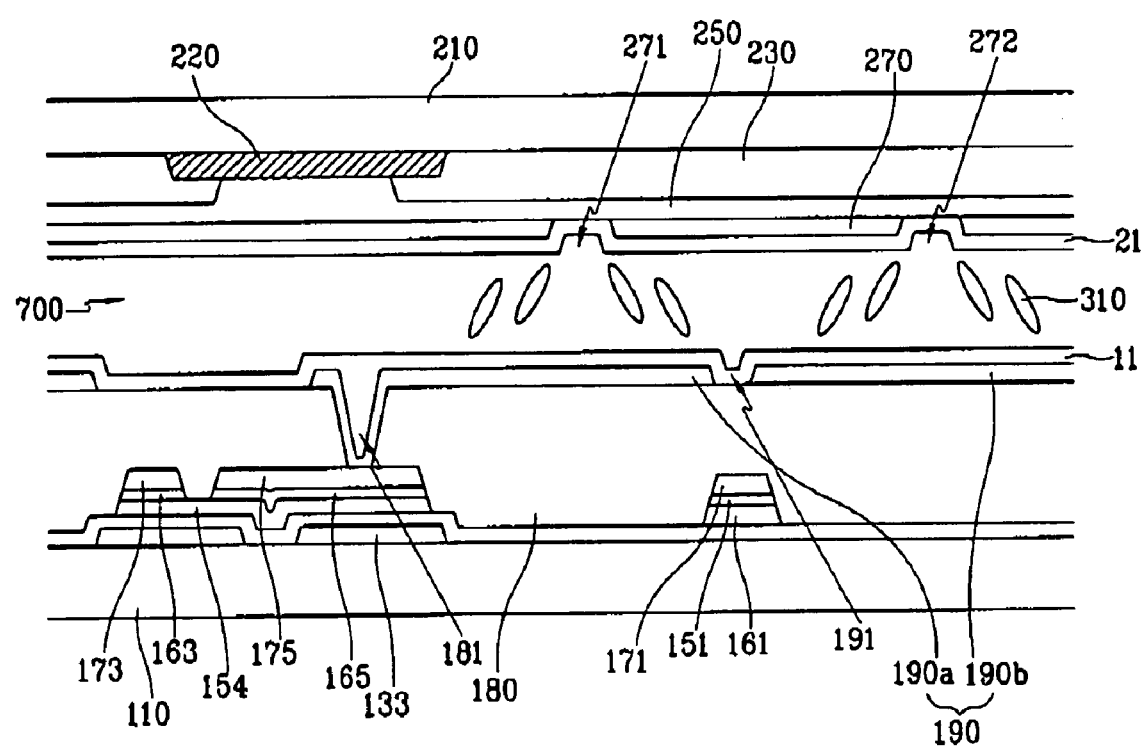
FIG. 7 is a sectional view of the LCD shown in FIG. 6 taken along the line VI-VI'.

FIG. 6 is a layout view of an LCD according to another embodiment of the present invention, and FIG. 7 is a sectional view of the LCD shown in FIG. 6 taken along the line VI-VI'.

Referring to FIGS. 6 and 7, an LCD according to this embodiment also includes a TFT array panel 100, a common electrode panel 200, and a LC layer 300 interposed therebetween.

Layered structures of the panels 100 and 200 according to this embodiment are almost the same as those shown in FIGS. 1-5.

Regarding the TFT array panel 100, a plurality of gate lines 121 including a plurality of gate electrodes 123 and a plurality of storage electrode lines 131 including a plurality of storage electrodes 133 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165, and a passivation layer 180 is formed thereon. A plurality of contact holes 181, 182 and 183 are provided at the passivation layer 180 and the gate insulating layer 140, and a plurality of pixel electrodes 190 and a plurality of contact assistants 95 and 97 are formed on the passivation layer 180. An alignment layer 11 is formed thereon.

Regarding the common electrode panel 200, a light blocking member 220, a plurality of color filters 230, an overcoat 250, a common electrode 270, and an alignment layer 21 are formed on an insulating substrate 210.

Different from the LCD shown in FIGS. 1-5, each pixel electrode 190 has a pair of cutouts 191a and 191b extending from opposite edges of the pixel electrode 190 along a data line 171 to approach each other and thus the pixel electrode 190 is partitioned into left and right partitions 190a and 190b disposed opposite each other with respect to the data line 171 and connected by a connection 192 disposed on a center of the pixel electrode 190.

Furthermore, each storage electrode line 131 has two stems extending in the transverse direction and placed near the gate lines 121. The two stems are connected to each other through a plurality of connections extending along a gap between two adjacent pixel electrodes 190 and overlapping the pixel electrodes 190, and one of the stems has the storage electrodes 133.

Moreover, there is no storage capacitor conductor shown in FIGS. 1-5 and each drain electrode 175 has an expansion overlapping a storage electrode 133 to form a storage capacitor.

The storage electrodes 133, the expansions of the drain electrodes 175, and the contact holes 181 exposing portions of the drain electrodes 175 have shapes of parallelogram.

In addition, the semiconductor stripes 151 have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

A manufacturing method of the TFT array panel according to an embodiment simultaneously forms the data lines 171, the drain electrodes 175, the semiconductors 151, and the ohmic contacts 161 and 165 using one photolithography process.

A photoresist pattern for the photolithography process has position-dependent thickness, and in particular, it has first and second portions with decreased thickness. The first portions are located on wire areas that will be occupied by the data lines 171 and the drain electrodes 175 and the second portions are located on channel areas of TFTs.

The position-dependent thickness of the photoresist is obtained by several techniques, for example, by providing translucent areas on the exposure mask 300 as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

As a result, the manufacturing process is simplified by omitting a photolithography step.

Many of the above-described features of the LCD shown in FIGS. 1-5 may be appropriate to the LCD shown in FIGS. 6 and 7.

An LCD according to another embodiment of the present invention will be described in detail with reference to FIGS. 8 and 9.

Figure 8:
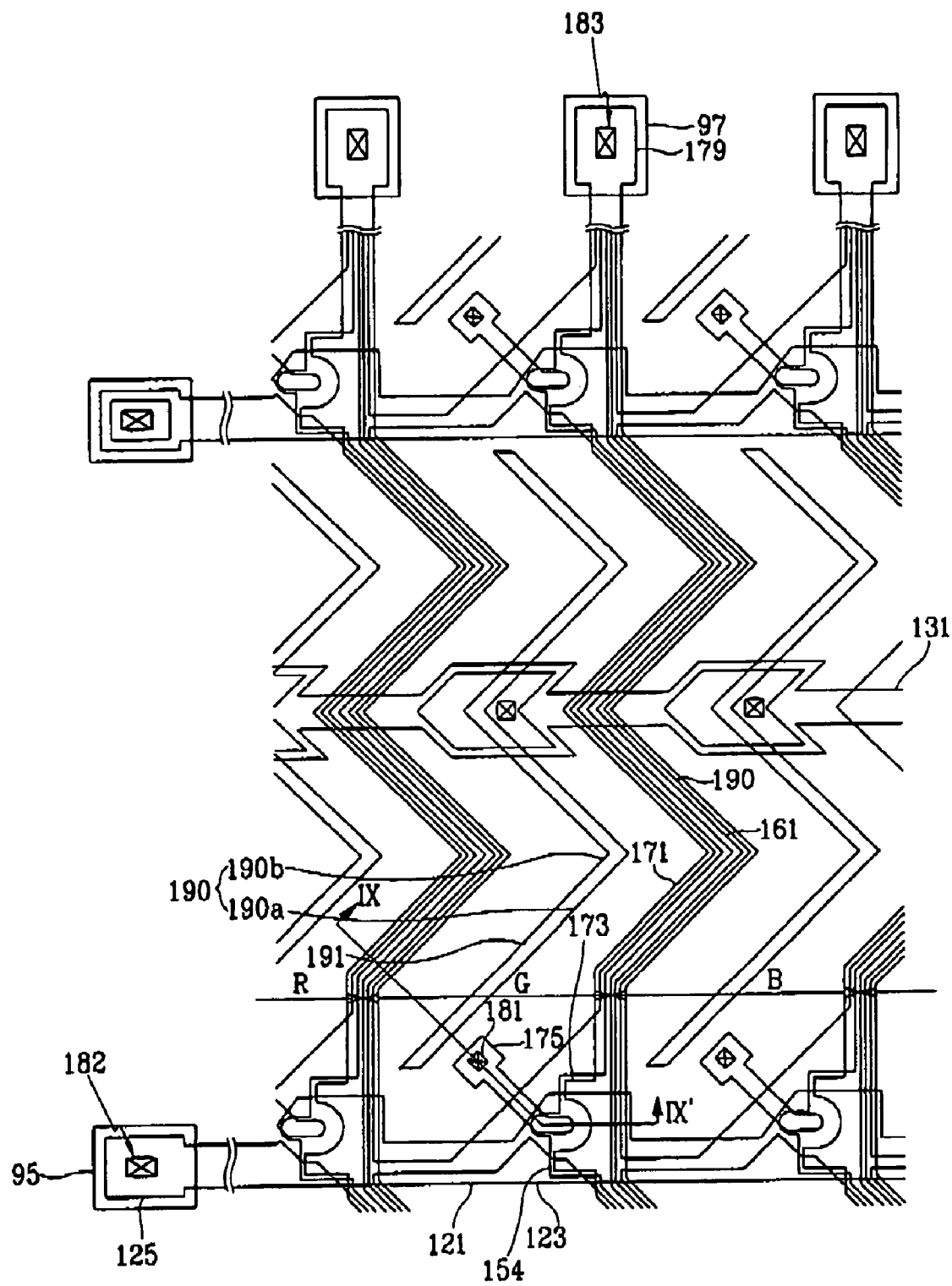
FIG. 8 is a layout view of an LCD according to another embodiment of the present invention.
Figure 9:
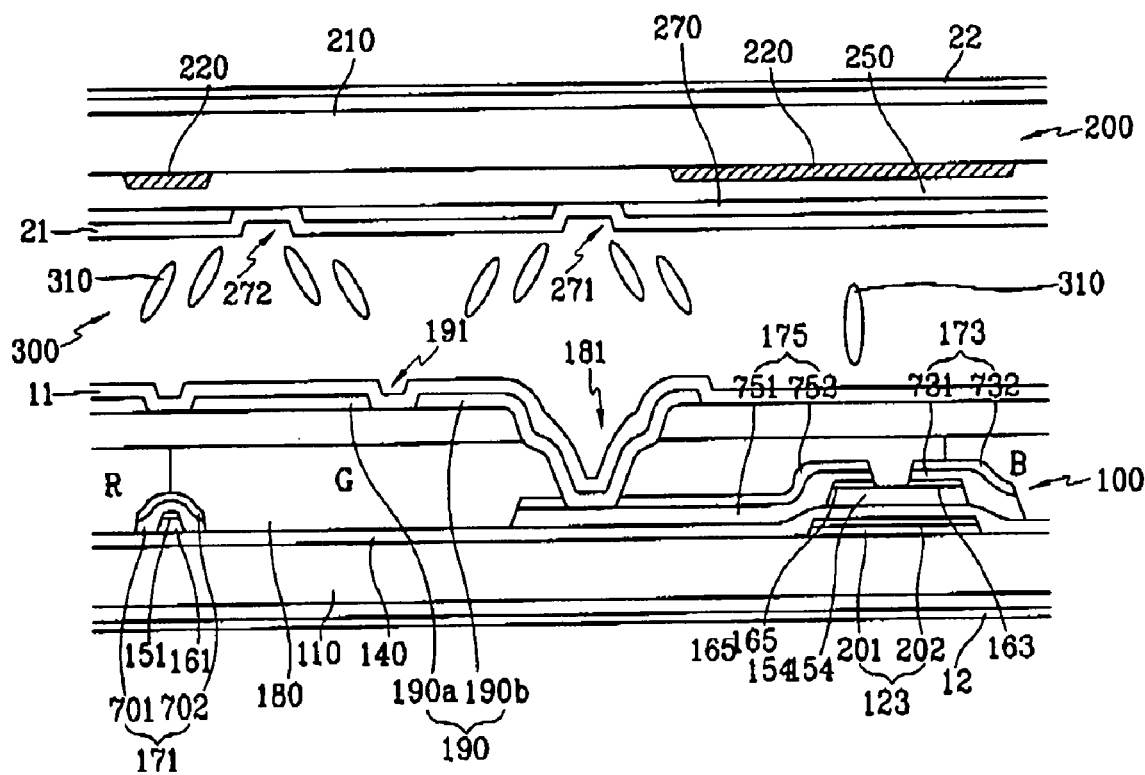
FIG. 9 is a sectional view of the LCD shown in FIG. 8 taken along the line IX-IX'.

FIG. 8 is a layout view of an LCD according to another embodiment of the present invention, and FIG. 9 is a sectional view of the LCD shown in FIG. 8 taken along the line IX-IX'.

Referring to FIGS. 8 and 9, an LCD according to this embodiment also includes a TFT array panel 100, a common electrode panel 200, and a LC layer 300 interposed therebetween.

Layered structures of the panels 100 and 200 according to this embodiment are almost the same as those shown in FIGS. 1-5.

Regarding the TFT array panel 100, a plurality of gate lines 121 including a plurality of gate electrodes 123 and a plurality of storage electrode lines 131 including a plurality of storage electrodes 133 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165, and a passivation layer 180 is formed thereon. A plurality of contact holes 181, 182 and 183 are provided at the passivation layer 180 and the gate insulating layer 140, and a plurality of pixel electrodes 190 and a plurality of contact assistants 95 and 97 are formed on the passivation layer 180. An alignment layer 11 is formed thereon.

Regarding the common electrode panel 200, a light blocking member 220, a plurality of color filters 230, an overcoat 250, a common electrode 270, and an alignment layer 21 are formed on an insulating substrate 210.

Different from the LCD shown in FIGS. 1-5, a plurality of red, green and blue color filter stripes R, G and B are formed under the passivation layer 180. Each of the color filter stripes R, G and B are disposed substantially between adjacent two the data lines 171 and extends in a longitudinal direction along the pixel electrodes 190 such that it is periodically curved. The color filter stripes R, G and B are not disposed on a peripheral area which is provided with end portions 179 of the data lines 171. The color filter stripes R, G and B have a plurality of openings placed on the drain electrodes 175 and the storage capacitor conductors 177 and having tapered sidewalls. Edges of adjacent color filter stripes R, G and B exactly match with each other. However, the edges may overlap to block the light leakage between the pixel areas.

Many of the above-described features of the LCD shown in FIGS. 1-5 may be appropriate to the LCD shown in FIGS. 8 and 9.

Since the pixel electrodes 190 are curved several times with maintaining the angle between the oblique edges of the pixel electrodes 190 and the gate lines 121, the width of a rectangular area occupied by a pixel electrode 190 that is curved at least twice is much smaller than that occupied by a pixel electrode 190 that is curved once. In addition, the oblique portions of the data lines 171 that define the shape of the pixel electrodes 190 are short and connected in zigzag. Accordingly, the shape of the pixel electrodes 190 is not easily recognized and it is possible to obtain an electric field sufficient to drive the liquid crystal molecules.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel comprising:
a substrate;
a plurality of first signal lines formed on the substrate;
a plurality of second signal lines formed on the substrate, intersecting the first signal lines, and including a plurality of bend portions having at least two zigzags and a plurality of straight potions, the bend portions and the straight portions alternating in series,
a plurality of pixel electrodes occupying a majority portion of areas defined by the first and the second signal lines; and
a plurality of thin film transistors connected to the first and the second signal lines and the pixel electrodes.

2. The thin film transistor array panel of claim 1, wherein each of the bend portions of the second signal lines comprises a plurality of rectilinear portions connected to each other and making angles of about 45 degrees with the first signal lines in clockwise and counterclockwise manners, respectively.

3. The thin film transistor array panel of claim 1, further comprising a plurality of third signal lines formed on the substrate, extending substantially parallel to the first signal lines, and overlapping the pixel electrodes to form storage capacitors.

4. The thin film transistor array panel of claim 1, wherein the thin film transistors include terminal electrodes connected to the straight portions of the second signal lines.

5. The thin film transistor array panel of claim 1, wherein the pixel electrodes have a cutout bisecting a corresponding of the pixel electrodes into two partitions.

6. A thin film transistor array panel comprising:
a substrate;
a plurality of first signal lines formed on the substrate;
a plurality of second signal lines formed on the substrate, intersecting the first signal lines, and including a plurality of bend portions having at least two zigzags and a plurality of straight portions, the bend portions and the straight portions alternating in series,
a plurality of pixel electrodes located substantially in areas defined by the first and the second signal lines; and
a plurality of thin film transistors connected to the first and the second signal lines and the pixel electrodes,
wherein the pixel electrodes have cutouts disposed on the data lines, each cutout bisecting a corresponding of the pixel electrodes into two partitions.

7. The thin film transistor array panel of claim 3, wherein the third signal line comprises a plurality of projections having a shape of a chevron that is symmetrical with respect to the third signal line.

8. The thin film transistor array panel of claim 5, wherein the cutout has a plurality of oblique portions expending substantially parallel to the bend portions of the second signal line.

* * * * *